Dec. 15, 1953     L. A. DE ROSA     2,662,977
RADIO IMPULSE SYSTEM FOR OSCILLOGRAPH CALIBRATION
Original Filed Dec. 5, 1942
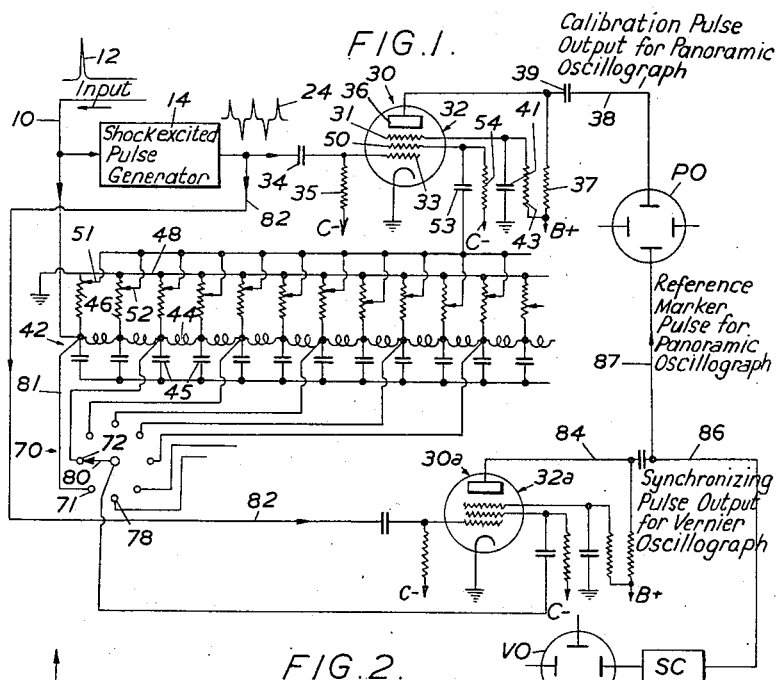
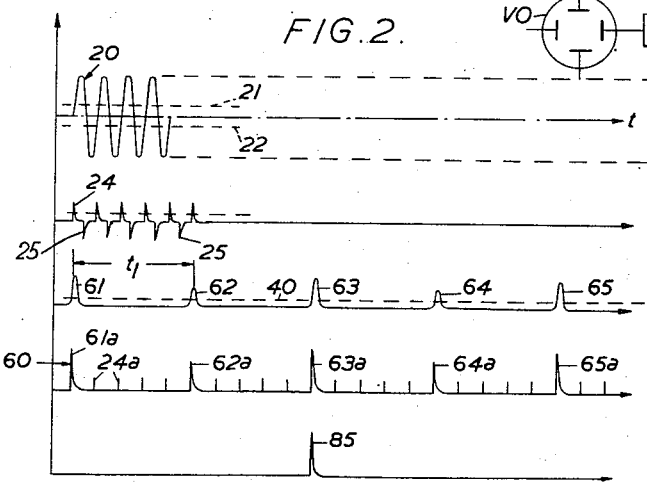
Inventor
LOUIS. A. DE ROSA
By
Attorney Patented Dec. 15, 1953

2,662,977

UNITED STATES PATENT OFFICE 2,662,977

RADIO IMPULSE SYSTEM FOR OSCILLOGRAPH CALIBRATION

Louis A. De Rosa, Bloomfield, N. J., assignor to International Telephone and Telegraph Corporation, a corporation of Maryland Continuation of application Serial No. 467,948, December 5, 1942. This application March 23, 1950, Serial No. 151,509

13 Claims. (Cl. 250—20)

This invention relates to radio impulse systems and more particularly to a system for generating pulses in a selected time relation in response to a synchronizing impulse. This application is a continuation of my earlier filed application Serial No. 467,948, filed December 5, 1942, now abandoned.

An object of the invention is to provide a method and means to produce in response to a synchronizing impulse a plurality of pulses of selected amplitude and displacement applicable for uses such as for the calibration of the screen of a cathode ray oscillograph, and as a reference marker and/or for synchronizing a vernier oscillograph.

The invention comprises generating a first series of small amplitude pulses preferably by shock excitation of a tuned circuit by energy of a synchronizing impulse, whereby a sinusoidal wave is produced. This wave is clipped so as to form a rectangular wave shape. This rectangular wave is then differentiated to form alternately positive and negative pulses of small amplitude, the positive pulses corresponding to the leading edges and the negative pulses corresponding to the trailing edges of the rectangular wave. These pulses when passed through a threshold clipping device provide a series of constant amplitude undirectional pulses.

In order to provide a second series of pulses having a greater displacement, energy of the synchronizing impulse is divided into a plurality of components and each component which constitutes a new pulse is retarded a different amount, preferably by amounts equal to multiples of the spacing between adjacent pulses of the first series. I selectively control the amplitude of the pulses corresponding to these different components and mix or combine them with the pulses of the first series, preferably before the threshold clipping operation. The pulses of this second series being controlled in time relation with respect to the pulses of the first series will add to the energy of certain of the pulses thereof to produce larger sharply defined pulses so as to set off in groups the pulses of the first series. By proper control of the amplitude of the pulses of the second series major and semi-major or decimal markers etc. can be produced. These pulses can be used to calibrate a panoramic oscillograph such as shown in the patent to H. G. Busignies, Patent No. 2,471,408, filed October 31, 1942, and granted May 31, 1949.

Energy of the pulses of the second series may be selected to provide a reference marker for the panoramic oscillograph and also for synchronizing a vernier oscillograph such as disclosed in my aforesaid copending application. In order to insure a pulse having a steep wavefront, the reference marker or vernier synchronizer pulse may be generated in the same manner as the first series mentioned above and the corresponding pulse thereof superimposed with the selected pulse of the second series.

For a better understanding of the method and means by which the method may be practiced, reference may be had to the following detailed description to be read in connection with the accompanying drawings, in which:

Fig. 1 is a schematic illustration of a pulse generating system in accordance with my invention; and Fig. 2 is a graphical illustration showing the steps of the method.

The system shown in Fig. 1 comprises an input circuit 10 which may be associated with radio or other electrical apparatus from which impulse energy 12 may be received as a source of synchronizing impulses. The synchronizing impulses are each used to shock excite a pulse generator 14 of the character disclosed in my copending application entitled "Timing System," Serial No. 466,557, filed November 23, 1942, now Patent Number 2,438,904 granted April 6, 1948, whereby a constant amplitude sinusoidal wave 20 (Fig. 2) is produced. The wave, however, need not be of constant amplitude but may be slightly damped. The generator 14 includes a limiting clipper whereby the wave 20 is clipped along levels 21 and 22 thereby producing a wave of rectangular shape. This rectangular wave is differentiated before leaving the generator 14 to produce alternately positive and negative pulses 24 and 25. The positive pulses 24 correspond to the leading edges of the cycles of the wave 20 while the negative pulses 25 correspond to the trailing edges thereof.

These pulses may be passed through a threshold clipping device 30 which includes a vacuum tube 32, the grid 33 of which is provided with a coupling circuit including condenser 34 and a resistor 35, the latter being connected to a point of negative bias C—. The anode 36 is provided with a positive bias B+ through a resistor 37. A screen grid 31 is grounded through a condenser 41 and subjected to a positive bias through resistor 43. The output 38 of the device 30 is taken off at the anode 36 through a condenser 39. The threshold clipping operation of the device 30 operates to provide a series of constant amplitude unidirectional pulses 24a such as indicated above the threshold level 40.

Since this first series of pulses has a constant amplitude, it is difficult, where the pulses are used for calibration purposes, to quickly count the spaces between a number of these pulses. In order to provide major and semi-major pulses so as to group the smaller pulses 24a, I provide a delay circuit 42 for the purposes of producing such major and semi-major pulses from the energy of the synchronizing pulses 12. The delay circuit may be of any known construction, and as shown comprises an inductance-capacity network similarly as disclosed in the above mentioned patent to H. Busignies. More particularly, the delay circuit 42 comprises a long inductance coil 44 having a series of taps to which a network of condensers 45 are connected in parallel arrangement. To each of the taps, I connect a potentiometer 46. The impedance of the potentiometer winding is selected high compared to the impedance of the network sections of the delay circuit to minimize feedback through the common ground connection 48. The outputs of the potentiometers are supplied to a second control grid 50 of the tube 32 through a coupling condenser 53. The grid 50 is provided through a resistor 54 with a negative bias.

When energy of the impulse 12 is applied to the delay circuit 42, the energy divides in passing therethrough into a plurality of components, one component each passing through a potentiometer 46. The component 61 passing through the first potentiometer reaches the potentiometer tap 51 thereof without having been delayed. The component 62 of the energy received through the tap 52 of the next potentiometer is delayed a time interval $t_1$. This time interval may be taken equal to a desired multiple of the spacings between adjacent pulses 24a. As shown in Fig. 2, for example, the time interval $t_1$ is taken equal to five of the spaces between adjacent pulses 24. The successive components received through the taps of the potentiometers 46 are mixed with the energy of the pulses 24a in the tube 32. The components 61, 62, etc., combine with the energy of the pulses 24a which are in exact time relation therewith to produce large pulses 61a, 62a, etc. in which the steepness of the wave-fronts thereof are insured by the pulses 24a. That is to say, the components in passing through the delaying network lose their sharpness, but the original sharpness, especially of the wave-fronts thereof, is substantially regained by the superimposing thereon of the corresponding pulses 24a. This results in the production at the output 38 of a calibration scale such as illustrated at 60.

Since the pulses produced by the component received through the potentiometer taps can be controlled by selective positioning of the taps, any desired amplitude relation of the pulses 61a, 62a, etc., can be produced. For example, alternate pulses 61a, 63a, etc. may be selected as the largest or major pulse markers while the pulses 62a, 64a, etc., may be selected to have a lesser amplitude but greater than pulses 24a so as to constitute semi-major or decimal markers. The individual control of the amplitude of the components provides further a means for compensating for reduction of the impulse energy as it is subjected to repeated division along the delay network 42.

In order to provide a synchronizing pulse output for the vernier oscillograph VO and also to provide a reference marker pulse for indication on the panoramic oscillograph PO of the starting point of the vernier indication of that part of the range covered by the vernier oscillograph, the following circuit is provided. A selecting device 70 is provided having a plurality of taps 71 to 78 and a movable contact 80 adapted to be moved for selective engagement with the taps 71 through 78. The taps 71 through 78 are connected to the input connections of alternate potentiometers 46 so that the energy at the taps 71, 72, 73, etc. correspond to the pulses 61a, 63a, 65a, etc. By proper adjustment of the contact 80 energy having the delay characteristics of the aforementioned pulses 61a, 63a, etc. may be tapped off from the delay circuit 42. This energy is applied to a vacuum tube 32a of a threshold clipping device 30a similar to the device 30 hereinbefore described. The pulse series 24, 25 produced by the generator 14 are applied to the tube 32a through connection 82. The tube 32a, however, is provided with a negative bias C— greater than tube 32 so that the pulses 24 will not appear in the anode circuit 84. The pulse of the series 24 which corresponds in time with the selected pulse energy applied to the tube 32a from the selector device 70 adds thereto to produce a sharply defined pulse 85 adaptable as a marker or synchronizing pulse. Tube 32a is maintained in a non-conductive condition until a pulse from 80 overcomes the C— bias to thereby render tube 32a conductive. Since the contact 80 is in engagement with the tap 72, this pulse 85 will correspond in time with the pulse 63a. This use of the pulses 24 insures a steep wavefront for the pulse 85.

It will be observed that movement of the contact 80 from tap to tap of the device 70 will cause the pulse 85 to move by jumps from major pulse to major pulse, that is, from pulse 63a to pulse 65a, etc. It will be understood, however, that the movement of the pulse 85 may be reduced to much smaller steps by providing taps for the device 70 one for each network section of the delay device 42.

The pulse 85 when used for synchronizing the sweep potential of the vernier oscillograph is applied through connection 86 to the sweep circuit SC of the vernier oscillograph. Energy of the pulse 85 may also be used as a reference marker by applying the energy through connection 87 to the vertical deflection plates of the panoramic oscillograph PO. The pulse 85 will thereby indicate on the panoramic oscillograph the point at which the sweep of the vernier oscilloscope commences. The interval covered by the sweep of the vernier may be arranged to equal 15 of the spaces definied by the pulses 24a. Thus, when the vernier sweep is shifted along the trace line of the panoramic oscillograph in groups of 10 such spaces there will be an overlapping of 5 spaces by the trace line on the vernier oscillograph. Thus, should a pulse appear near the end of the sweep of the vernier for one position of the device 70, the pulse may be located more nearby the center of screen of the vernier oscillograph by shifting the device 70 one position.

While I have disclosed a specific apparatus for producing calibration pulses for a panoramic oscillograph and a reference pulse output for synchronizing the vernier oscillograph and for indicating on the panoramic oscillograph the timing of the vernier oscillograph, it will be understood that the form herein illustrated and 2,662,977 described is given by way of example only and not as limiting to the objects of the invention and the appended claims.

What I claim is:

1. A method of generating in response to a synchronizing impulse a plurality of calibration pulses comprising producing in synchronism with said impulse a first series of pulses having a given spacing between adjacent pulses, deriving from energy of the synchronizing impulse a series of discrete pulse components, retarding said pulse components different multiples of the spaces between the pulses of said first series, and mixing the two series of pulses so that the second series of pulses add to those pulses of said first series corresponding in time to provide a calibration pattern.

2. The method defined in claim 1 wherein the amplitudes of the pulses of the second series are individually controlled to selectively produce large and small pulses thereby producing when mixed with the first series of pulses major and semi-major pulse markers for given points of time.

3. A method of producing a sharply defined pulse selectively displaced with respect to a synchronizing impulse comprising generating a series of pulses in response to said impulse, deriving from said synchronizing impulse a series of individually independent components, retarding said components by individually different amounts, and combining a component having a desired retardation with a corresponding pulse of said first named series.

4. A method of producing a sharply defined pulse selectively displaced with respect to a synchronizing impulse comprising producing in synchronism with said impulse a first series of pulses having a given displacement between adjacent pulses, deriving from said synchronizing impulse a series of descrete pulse components, retarding said pulse components different multiples of the spaces between the pulses of said first series, selecting one of the pulse components of the second series having a desired displacement, and combining the selected pulse with the corresponding pulse of said first series of pulses.

5. A system for producing in response to a synchronizing impulse a plurality of calibrating pulses comprising means to generate in response to said impulse a first series of pulses having a given spacing and amplitude, a delay device provided with a plurality of outlets, each outlet including means for controlling the amplitude of pulses passed therethrough, said device being arranged to divide the energy of the synchronizing impulse into a plurality of components one each to be fed through one of said outlets, said device being adapted to retard each component a different amount so as to provide a second series of pulses having a displacement between adjacent pulses equal to a multiple of the displacement between adjacent pulses of said first series, and means for mixing the two series of pulses so that the pulses of the second series add to corresponding pulses of said first series.

6. The system defined in claim 5 wherein said mixing device includes means to threshold clip the pulse potentials supplied thereto.

7. The system defined in claim 5 wherein the amplitude controlling means associated with the outlets of said delay device comprise potentiometers, said potentiometers being adjustable to provide the second series of pulses with pulses of large and small amplitudes, and the mixing means is provided with means for threshold clipping the pulse potentials so that the output thereof produces minor, major and semi-major pulses in a given scale calibration pattern.

8. A system for producing a sharply defined pulse selectively displaced with respect to a synchronizing impulse comprising means to generate a series of pulses in response to said impulse, means to retard by different amounts components of the energy of said impulse, means to selectively tap off from the energy retarding means of at least one pulse energy components retarded a desired displacement with respect to said impulse, and means to combine the tapped-off energy with a pulse of said series to produce a pulse shape having a given displacement with respect to said impulse equal to the retardation of said tapped-off energy, the pulse of said series operating to sharpen the pulse shape of said tapped-off energy.

9. The system defined in claim 8 wherein the retarding means is provided with taps so disposed as to provide tap-off points for retarded energy displaced amounts equal to multiples of the displacement between adjacent pulses of said series.

10. A radio impulse system comprising a source of synchronizing impulses, means to generate in response to an impulse of said source a first series of pulses, a delay device provided with a plurality of outlets to divide the energy of the synchronizing impulse into a plurality of components one each to be fed through one of said outlets, said device being adapted to retard each component a different amount so as to provide a second series of pulses having a displacement between adjacent pulses equal to a multiple of the displacement between adjacent pulses of said first series, means for mixing the two series of pulses so that the second series of pulses add to corresponding pulses of said first series to provide a calibration pattern, means adjustable to selectively tap off from said delay device energy of one of the pulses of said second series, and means to combine the tapped-off energy with a pulse of said first series to produce a pulse shape having a displacement with respect to said impulse equal to the retardation of said tapped-off energy, the displacement of said pulse shape being determined by the adjustment of said selective tap-off means.

11. A system for producing in response to a synchronizing impulse a plurality of calibrating pulses, comprising means to generate a first series of pulses in response to said impulse, means to retard by different amounts components of the energy of said impulse, so as to provide a second series of pulses having a displacement between adjacent pulses equal to a multiple of the displacement between adjacent pulses of said first series, and means for mixing the two series of pulses so that the pulses of the second series add to the corresponding pulses of said first series.

12. In a radio impulse system in which radio pulses are received and supplied to a panoramic oscilloscope and a vernier oscilloscope, a source of low frequency pulses, the combination of a source of periodic pulses having a frequency higher than said source of low frequency pulses, a mixer having an output circuit and a pair of input circuits, a connection for supplying low frequency pulses to one input circuit of said mixer, a connection for supplying high frequency pulses from said high frequency source to the other input circuit of said mixer, said mixer serving to pass to said output circuit only the high frequency pulses which coincide with low frequency pulses, a sweep generator for the vernier oscilloscope controlled by the pulses in the output circuit of said mixer, and a variable phase shifter included in the connection from said source of low frequency pulses to said mixer for adjustably timing the pulses in the output circuit of said mixer.

13. In a radio impulse system in which radio pulses are received and supplied to a panoramic oscilloscope and a vernier oscilloscope, a source of low frequency pulses, the combination of a source of periodic pulses having a frequency higher than said source of low frequency pulses, a mixer having an output circuit and a pair of input circuits, a connection for supplying said low frequency pulses to one input circuit of said mixer, a connection for supplying high frequency pulses from said high frequency source to the other input circuit of said mixer, said mixer serving to pass to said output circuit only the high frequency pulses which coincide with low frequency pulses, a sweep generator for the vernier oscilloscope controlled by the pulses in the output circuit of said mixer, and means connected to the output of said mixer for producing a marker indication on said panoramic oscilloscope, and a variable phase shifter included in the connection from said source of low frequency pulses to said mixer for adjustably timing the pulses in the output circuit of said mixer.

LOUIS A. DE ROSA.

References Cited in the file of this patent

UNITED STATES PATENTS

| Number | Name | Date |
| --- | --- | --- |
| 2,403,278 | Hershberger | July 2, 1946 |
| 2,417,136 | Smith | Mar. 11, 1947 |
| 2,423,082 | Busignies | July 1, 1947 |
| 2,423,644 | Evans | July 8, 1947 |
| 2,450,341 | Hershberger | Sept. 28, 1948 |